UNITED STATES PATENT OFFICE.

JOHN WARNE PHILLIPS, OF CHICAGO, ILLINOIS, ASSIGNOR TO ALLEN R. SMART, OF CHICAGO, ILLINOIS.

TREATMENT OF SEWAGE-SLUDGE.

1,284,441.   Specification of Letters Patent.   Patented Nov. 12, 1918.

No Drawing.   Application filed April 10, 1916. Serial No. 90,164.

*To all whom it may concern:*

Be it known that I, JOHN WARNE PHILLIPS, a citizen of the United States, residing at Chicago, in the county of Cook and State of Illinois, have invented a new and useful Improvement in the Treatment of Sewage-Sludge, of which the following is a specification.

My invention relates to the treatment of sewage, and more particularly to a process of recovering certain valuable constituents from the solid and semi-solid portions thereof, the process being further characterized by the fact that the sewage or sludge thereof containing the said solid and semi-solid constituents is itself rendered more valuable by the treatment.

More particularly, it is the object of the present invention to facilitate the recovery of the greases of oleaginous matter in sewage, and at the same time to enhance the value of the sludge as a fertilizer. The raw material for my process consists of the sludge of sewage obtained either by simple sedimentation of the sewage or by filtration, or by a combination of these or equivalent methods, as carried out in sewage disposal and purification plants. The sludge resulting from such separation, and being more or less wet according to the method employed in its separation, will in general consist of earthy matter, nitrogenous and other organic matter, together with a wide variety of other substances, the character and amounts of which will depend upon the source of the sewage, as is obvious. Among the more valuable of these additional constituents are grease or oils, which exist in part as such and in part as insoluble metallic soaps, such as soaps of calcium and magnesium.

In the practice of my present invention the following procedure is adopted:

The sludge, freed of water to a greater or less extent, as indicated above, is treated with phosphoric acid in quantities sufficient to decompose the insoluble metallic soaps and carbonates, and preferably in excess of this proportion, in order that the tri-metallic phosphate which would be formed by the addition of molecular quantities sufficient for decomposition will be reduced to superphosphates. A slight excess of acid over that capable of entering into any reaction may be used without injury to the product.

In the practice of my process, specimen analyses of the particular sewage sludge to be treated will be taken at relatively infrequent intervals, from which the approximate amount of acid required to decompose the soaps and carbonates present may be determined. Ordinarily, the analyses will show considerable variation, particularly as to the quantity of insoluble soaps present, this being due to seasonal and even daily variations in the character of the sewage, as, for instance, by changes in industrial conditions in the area from which the sewage is drawn. In the practical operation of the process, therefore, a sufficient excess of phosphoric acid will be used to take care of the maximum requirements, and by reason of the comparatively wide range of re-actions possible it will be found that under any conditions reasonably approximating the conditions indicated by the analyses statement, all of the phosphoric acid added will enter into combination with the bases present.

After the sludge has been treated by the phosphoric acid, as described, the grease and oleaginous matter, including the fatty acids liberated by the decomposition of the insoluble soaps, will be extracted by any suitable solvent, such as light hydrocarbon oils, for instance, from which solvent they may be recovered by well-known methods.

Where the sludge contains too high a percentage of moisture after the phosphoric acid treatment, it will preferably be partly or wholly dried prior to extraction.

The sludge, after the extraction of the grease therefrom, will preferably be dried to remove all traces of the solvent, either by an air-blast or by any preferred means. The finished product will then form a fertilizer of the highest grade, free of grease and containing, in addition to the nitrogenous and other valuable organic constituents of the sewage, a greater or less proportion of phosphates and superphosphates.

This blend of phosphates and organic and nitrogenous matter forms an approximately "balanced" fertilizer for general use, and is therefore peculiarly desirable as embodying in the one homogeneous composition substantially all of the elements required for the proper nourishment and support of plant life.

As evidencing the utility of the present process, it may be mentioned that the increase in value of the sludge as a fertilizer by reason of my treatment thereof will ordinarily equal or exceed the entire cost of the treatment, so that the value of the grease recovered from the treated sluge may be looked upon as a net gain.

While I have described in considerable detail the preferred process in accordance with my invention, it is to be understood that this description is illustrative only, and for the purpose of making the invention more clear, and that I do not regard the invention is limited to the detailed steps of procedure described, nor to any of them, except in so far as such limitations have been included within the terms of the following claim, in which it is my intention to claim all novelty inherent in my invention as broadly as is permissible in view of the prior art.

What I claim as new and desire to secure by Letters Patent is—

The process of treating the solid and semi-solid constituents of sewage, which consists in adding phosphoric acid alone thereto in excess of the quantity required to decompose the insoluble metallic soaps and carbonates therein, and extracting the oleaginous matter with a solvent thereof.

JOHN WARNE PHILLIPS.